J. WEEKS.
Scale-Beam.
No. 8,634. Reissued Mar. 25, 1879.
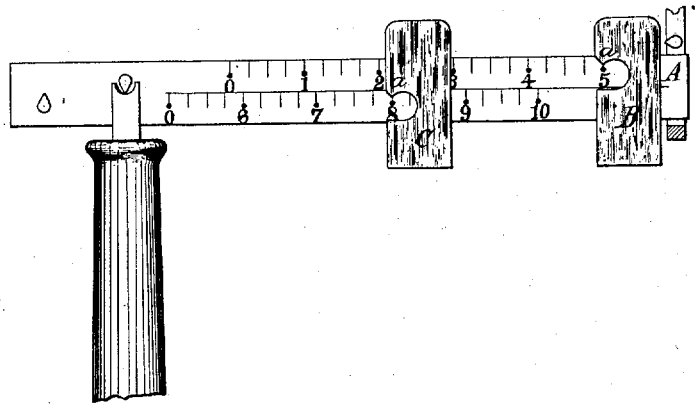
E. J. Buchheit Jr.
John Tyler } Witnesses
John Weeks Inventor
by Wilhelm & Bonner
Attorneys
N. PETERS, PHOTO-LITHOGRAPHER, WASHINGTON, D. C.

UNITED STATES PATENT OFFICE.

JOHN WEEKS, OF BUFFALO, NEW YORK.

IMPROVEMENT IN SCALE-BEAMS.

Specification forming part of Letters Patent No. 204,177, dated May 28, 1878; Reissue No. 8,634, dated March 25, 1879; application filed February 15, 1879.

*To all whom it may concern:*

Be it known that I, JOHN WEEKS, of the city of Buffalo, in the county of Erie and State of New York, have invented certain new and useful Improvements in Scale-Beams, of which the following is a specification, reference being had to the accompanying drawing.

This invention relates more particularly to that class of scale-beams which are provided with several graduated indexes or series of characters, each index forming a progressive series of characters from the end of the preceding index to the beginning of the next succeeding one, and having a sliding poise for each index or series of characters, so that by moving the poises successively from the first to the last index the last poise moved in weighing will indicate at once the correct weight. These poises, as ordinarily constructed, can be moved one independent of the other, whereby persons using these scales are liable to move a poise pointing to a higher series of characters before moving the poise pointing to the preceding series, when the poise will indicate incorrectly.

The object of my invention is to remedy this defect, and also to simplify the construction of the beam; and to that end it consists principally in arranging the several poises in such manner that a poise pointing to a high series of characters cannot be moved until the poise pointing to the preceding lower series has been moved; also, in arranging all the poises on a single bar or beam, as will be hereinafter more fully set forth.

The accompanying drawing represents a side elevation of a scale-beam embodying my invention, and provided with two indexes and two poises.

A represents the scale-beam, and B C the two poises sliding thereon. As shown in the drawing, the beam is provided with two graduations or indexes, the first or upper graduation commencing with 0 and terminating with 5, and the second graduation having its first unit marked 6 and terminating with 10, which latter figure indicates the weighing capacity of the beam, whatever the units may be. Each poise is provided with a pointer or index-hand, *a*, pointing to one of the graduations, the pointer of the poise B pointing to the upper or first graduation, and that of the poise C to the lower or second graduation. When not in use all the poises are placed at the extreme inner end of the beam, where the pointer of each poise indicates 0.

In weighing, the poise B, pointing to the first or lowest series of figures, is moved toward the outer end of the beam until it arrives at the end of its graduation. If this is insufficient to balance the weight the second poise, C, is moved to the right until the weight is balanced. The figure indicated by the second poise, C, represents the correct weight. If three or more poises and indexes are used the operation is the same, the poises being moved to the outer end of the beam successively until the proper weight is reached.

It is obvious that when all the poises are placed at the inner end of the beam, pointing to 0, a poise pointing to a higher series of characters cannot be removed until all the preceding poises have been moved, thereby preventing the person using the scale from inadvertently moving a poise pointing to a high graduation, and thereby reading off the weight incorrectly.

In scales having graduated beams, large amounts cannot be weighted accurately down to the lowest denominations without extending the beam to such a length as to make it inconvenient for use and too heavy to be sensitive for small weights. It has been customary, therefore, to employ separate beams, one or more for the heavy weights, and one for the light weights, when the weights indicated on each beam must be added to obtain the correct weight.

By arranging all the poises and graduations upon a single beam, as shown in the accompanying drawing, the necessity for using separate beams is obviated and the operation of weighing performed more conveniently and with less liability of mistake.

By using several poises and a corresponding number of graduated indexes upon a single beam, I obtain the effect of a beam as many times as long as an ordinary beam as there are indexes upon the beam, thereby increasing the weighing capacity of the beam without increasing its length, or I increase the number of subdivisions of the graduation and reduce the same to more minute fractions without increasing the length of the beam, thus rendering the beam simpler, cheaper, lighter, and more sensitive.

I claim as my invention—

1. A scale-beam provided with two or more poises, arranged to come in contact with each other, and each pointing to a separate graduated index or series of characters, the several series being numbered progressively, whereby the poise pointing to the higher series is prevented from being moved until the poise pointing to the preceding lower series has been moved.

2. A scale-beam provided with two or more poises sliding upon the same bar, and each pointing to a separate graduated index or series of characters, substantially as set forth.

3. A single beam for platform or other graduated beam-scales, having thereon different lines of figures, forming a progressive series from one line to the other, so as to operate as one continuous line, substantially as specified.

4. In a weighing-scale, two or more sliding poises moving on a single beam, each poise having an index-hand pointing to a separate line of figures on the single beam, substantially as hereinbefore specified.

JOHN WEEKS.

Witnesses:

EDWARD WILHELM,
CHAS. J. BUCHHEIT.